UNITED STATES PATENT OFFICE.

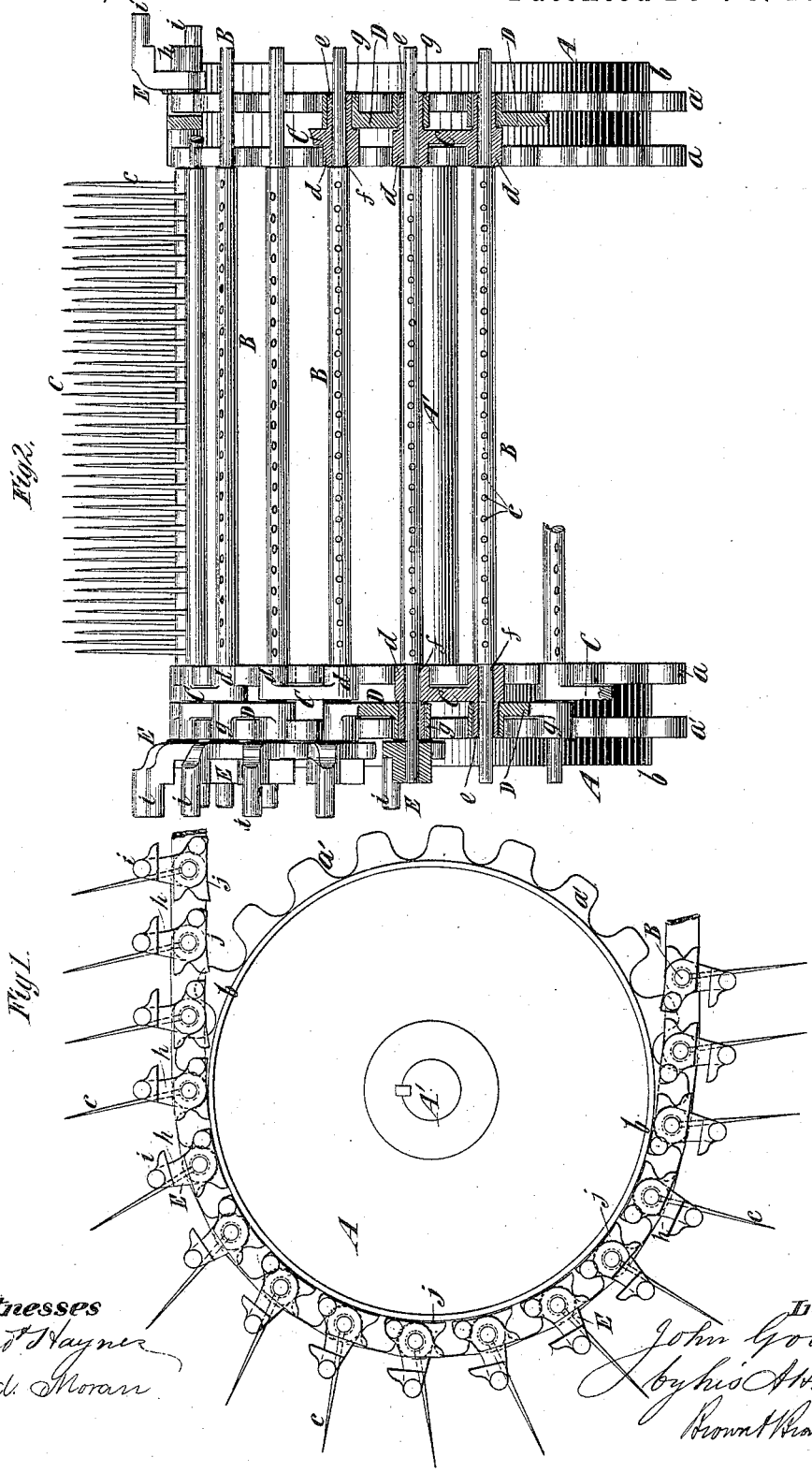

JOHN GOOD, OF BROOKLYN, NEW YORK.

CHAIN AND CHAIN-WHEEL FOR MACHINERY FOR PREPARING FIBROUS MATERIALS, &c.

SPECIFICATION forming part of Letters Patent No. 311,577, dated February 3, 1885.

Application filed March 11, 1882. Renewed March 14, 1884. (No model.)

*To all whom it may concern:*

Be it known that I, JOHN GOOD, of the city of Brooklyn, in the county of Kings and State of New York, have invented certain new and useful Improvements in Chains and Chain-Wheels for Use in Machinery for Preparing Fibrous Materials and for other Purposes, of which the following is a specification.

My invention is more especially applicable to the chains and the wheels for supporting and driving the same employed in the various kinds of machinery used in the preparation of hemp, flax, and other fibrous materials—as, for instance, hackling-machines, spreaders, drawing-frames, and jennies.

In machines of the kind above mentioned are employed what I term "belts of pins," each belt consisting of two chains, and rods or bars extending between and carried by the chains, and themselves carrying the pins. In these chains the pin-carrying rods or bars have been fitted loosely in the chain-links, and the links have been connected by hubs and eyes independent of said rods or bars, as described in my United States Letters Patent No. 108,473, dated October 18, 1870, and the teeth of the chain-wheels engage with such hubs, instead of with the rods or bars.

An important object of my invention is to make the framing of machines comprising such belts of pins of less width than heretofore in proportion to the width of the series of pins, and thereby to bring the carrying-chains as close as possible to the pins, and so reduce the liability of the pin-carrying rods or bars bending while in operation.

A further object of the invention is to give the chain-wheels a double hold on the chains, or a hold thereon on both sides of the links, and thereby to produce a more even pull on the chains.

The invention consists in the combination, in a chain, of alternate links having hubs upon their inner and outer sides, and intermediate links having hubs upon their outer sides, which are bored to receive the hubs on the outer sides of the alternate links, and thereby connect the alternate links to form the chain.

The invention also consists in the combination, with a chain of the kind above described, of a chain-wheel having two notched flanges, between which the chain works, and which engage, one with the hubs on the inner side of the alternate links and the other with the hubs on the outer side of the intermediate links, whereby I produce an even and uniform pull on both sides of the chain, and obviate any danger of the links canting relatively to each other.

The invention also consists in the combination, with two chains of the kind above described, of pin-carrying rods or bars extending between and loosely fitting in said chains, dogs fixed to the ends of said rods or bars and adapted to engage with guides for holding the said rods or bars in position to present their pins properly, and having arc-shaped bearing-surfaces, and chain-wheels having double-notched flanges for driving said chains, and each having a rim extending beyond the outer flange, to form a bearing for the arc-shaped surfaces of the dogs as they pass round the wheels, as more fully hereinafter described.

In the accompanying drawings, Figure 1 represents a side view of a portion of a belt of pins and a chain-wheel engaging with the chains of said belt, and Fig. 2 represents a face or edge view of a pair of chain-wheels and a partly-sectional face view of the belt of pins as it passes around said wheels.

Similar letters of reference represent corresponding parts in both the figures.

A A designate the pair of chain-wheels, which are fast upon a shaft, A', and rotate in unison. Each chain-wheel A is provided with inner and outer notched flanges, $a\ a'$, the first, $a$, of which is placed at the extreme inner edge of the rim of the wheel, and the rim projects outward beyond the outer flange, $a'$, as clearly shown at $b$.

B designates the rods or bars of the belt of pins, and $c$ designates the pins, which are arranged in rows transversely of the belt and are fixed in the rods or bars B. These rods or bars are connected near their ends to and carried by two chains which are of novel construction. These chains are each composed of alternate links C on the inner side of the chain, and intermediate links, D, on the outer side of the chain, arranged and connected as clearly shown in Fig. 2. The alternate links C are provided upon their inner sides with hubs $d$, and upon their outer sides with hubs $e$, and the rods or bars B are shouldered or reduced in diameter at their end portions, and are inserted loosely in holes f in the alternate links C, concentric with the hubs d and e.

The intermediate links, D, are provided on their outer sides with hubs g, which are bored out, so as to fit the finished exteriors of the hubs e, and by them the alternate links C are connected together. The width of the space between the flanges a a' of the chain-wheels A is sufficient to receive the chain-links C D, and the notched flange a engages with the hubs d on the alternate links C, and the flange a' engages with the hubs g on the intermediate links, D. It will be seen that the chain-wheels engage with the chains on both their inner and outer sides, and they therefore have a uniform pull upon the chains, and there is no liability of the links canting relatively to each other. The rods B fit loosely in the chains, as above stated, and are free to turn therein. The rods B project outward beyond the chains and have fixed securely to their ends dogs E, which are provided with grooves h, and pins or projections i, whereby they are guided upon tracks or ways at the sides of the machine, so that the pins c will always be presented at a proper angle relatively to their line of movement. These dogs, broadly considered, are not new. Each of the dogs E has an arc-shaped bearing-surface, j, which is formed on the same radius as the rim of the chain-wheel A, and as the dogs E pass around the wheels A the arc-shaped surfaces j bear upon the rim b which projects beyond the outer flange, a', of the wheel A. By this means the rods B are caused to turn with the chains as they pass around the wheels A, and the pins are thereby reversed in position so as to project downward instead of upward.

What I claim as my invention, and desire to secure by Letters Patent, is—

1. The combination, in a chain, of alternate links provided with hubs upon their outer sides, and also upon their inner sides, and intermediate links provided with hubs on their outer sides which receive the hubs on the outer sides of the alternate links, and thereby connect the alternate links to form the chain, substantially as and for the purpose specified.

2. The combination, with a chain composed of the alternate links provided with hubs on their outer and inner sides, and intermediate links provided with hubs on their outer sides fitting upon the hubs on the outer sides of the alternate links, of a chain-wheel provided with two notched flanges, between which the links of the chain work, and which engage one with the hubs on the inner sides of the alternate links and the other with the hubs on the outer sides of the intermediate links, substantially as and for the purpose specified.

3. The combination of the wheels A, provided with flanges a a', and the projecting rim b, the chain composed of the links C D, provided with hubs d e g, the pin-carrying bars or rods B, passing loosely through the chains, and the dogs E, provided with the arc-shaped bearings j, fitting the rim b, all substantially as and for the purpose specified.

JOHN GOOD.

Witnesses:
 FREDK. HAYNES,
 ED. MORAN.